Figure 1:
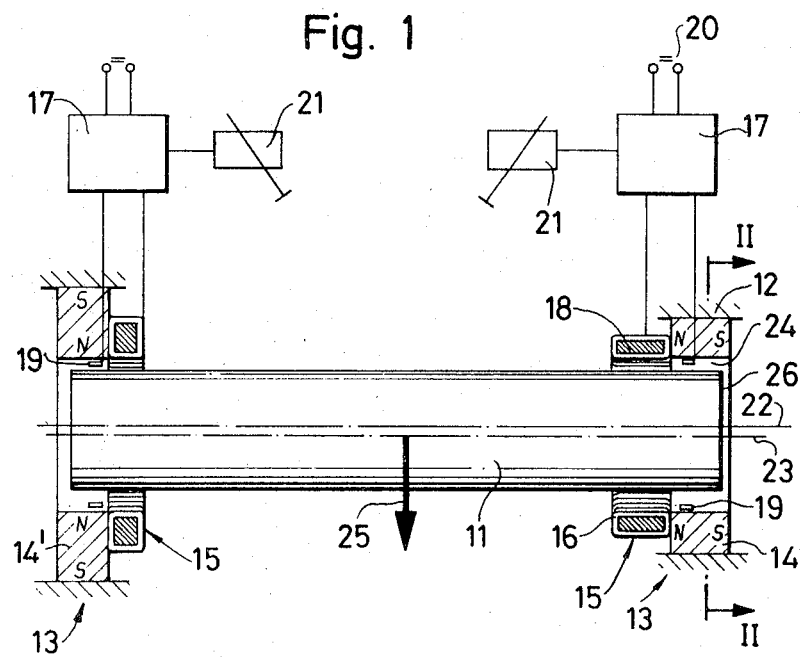

United States Patent [19]
Boden et al.

[11] 3,845,997
[45] Nov. 5, 1974

[54] MAGNETIC BEARING ASSEMBLY FOR JOURNALLING A ROTOR IN A STALOR

[75] Inventors: Karl Boden, Oberteuringen; Werner Geweke, Rodenberg; Dietrich Scheffer, Friedrichshafen, all of Germany

[73] Assignee: Padana AG, Zug, Switzerland

[22] Filed: Mar. 19, 1973

[21] Appl. No.: 342,893

[30] Foreign Application Priority Data
Mar. 20, 1972 Germany............................ 2213522
Mar. 20, 1972 Germany............................ 2213465

[52] U.S. Cl. ............................................. 308/10
[51] Int. Cl. ............................................ F16c 39/06
[58] Field of Search ...................................... 308/10

[56] References Cited
UNITED STATES PATENTS

| | | | |
|---|---|---|---|
| 3,112,962 | 12/1963 | Lautzenhiser......................... | 308/10 |
| 3,146,038 | 8/1964 | Lautzenhiser......................... | 308/10 |
| 3,243,238 | 3/1966 | Lyman................................ | 308/10 |
| 3,473,852 | 10/1969 | Lyman................................ | 308/10 |
| 3,490,816 | 1/1970 | Lyman................................ | 308/10 |
| 3,565,495 | 2/1971 | Lyman................................ | 308/10 |
| 3,650,581 | 3/1972 | Boden et al.......................... | 308/10 |

*Primary Examiner*—R. Skudy
*Attorney, Agent, or Firm*—Harness, Dickey & Pierce

[57] ABSTRACT

The invention provides a magnetic bearing assembly for journalling a rotor which is at least partly ferromagnetic in a stator, the bearing assembly being able to absorb transverse forces acting on the rotor. The assembly includes radial bearing means holding the rotor on a desired axis of rotation and at least one magnet. An air gap is defined between the rotor and the magnet in which a magnetic field is set up. The magnetic field has a first magnetic field component which is constant around the periphery of the air gap and on which is superimposed a second magnetic field component which varies around the periphery of the air gap to absorb the transverse forces.

30 Claims, 12 Drawing Figures

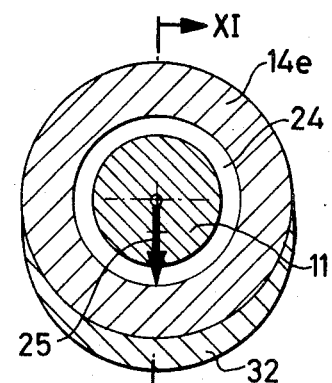
Fig. 10
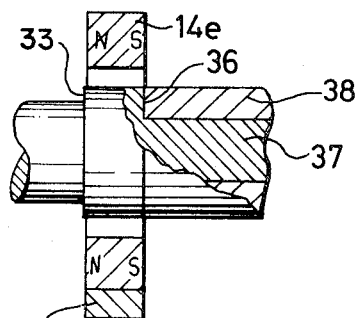
Fig. 11
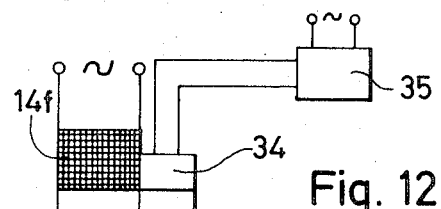
Fig. 12
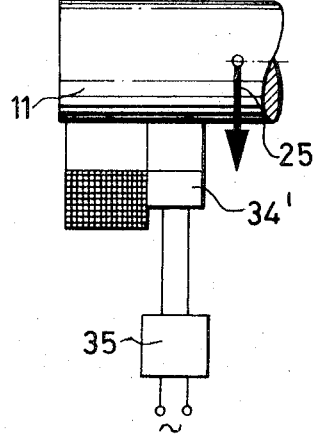
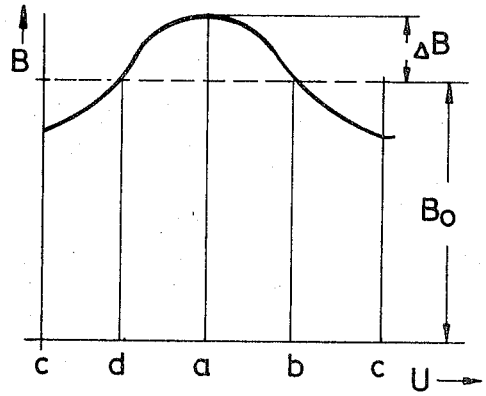
Fig. 3

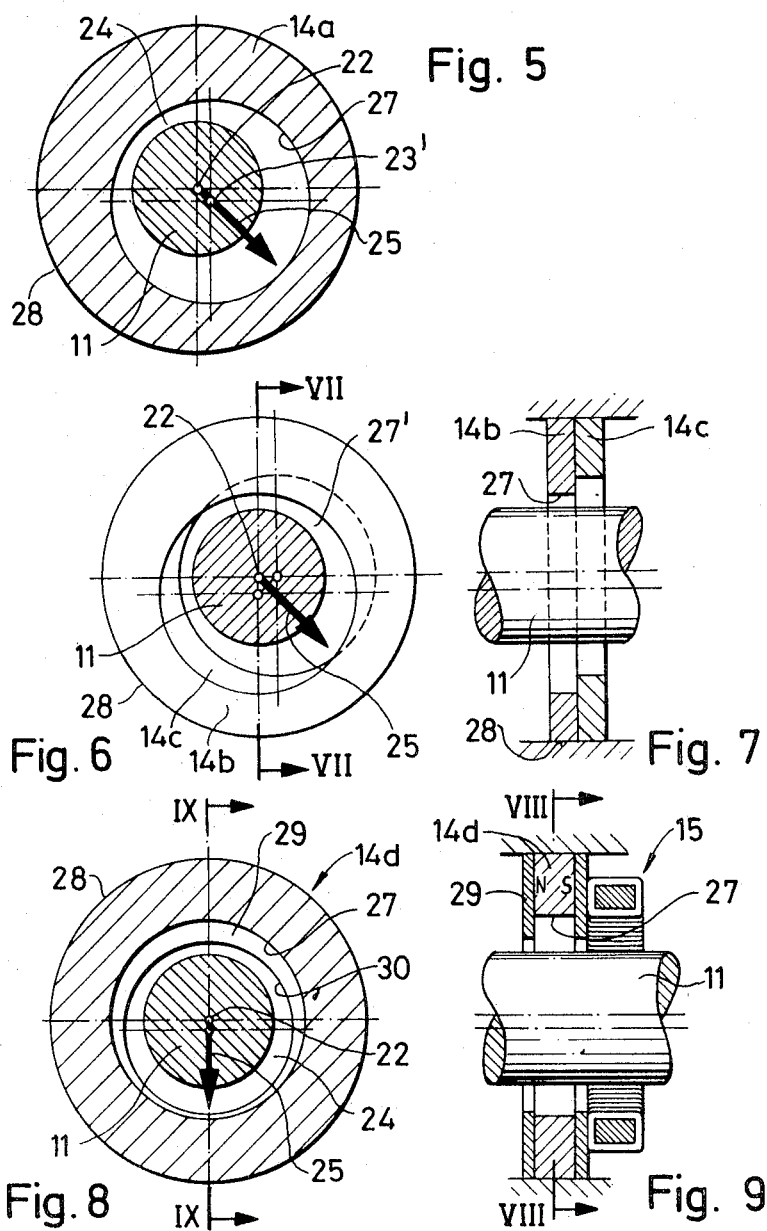

MAGNETIC BEARING ASSEMBLY FOR JOURNALLING A ROTOR IN A STALOR

The present invention relates to a magnetic bearing assembly for journalling a rotor which is at least partly ferromagnetic in a stator.

A magnetic bearing assembly is described in U.S. Pat. No. 3,650,581, entitled "Bearing Systems," issued Mar. 21, 1972 in the names of Karl Boden and Dietrich Scheffer. Although it is possible to modify the bearing assembly described therein for journalling a rotor having a horizontal axis of rotation or a rotor having a more or less constant radial load, these radial forces have to be absorbed by actively controlled radial bearing means. However, this not only considerably increases the overall size and the energy requirement for the radial bearing means, but also increases the forces acting to decelerate rotation of the rotor (bearing friction) because of the inhomogeneity thus produced in the magnetic field.

However, bearings which can absorb transverse forces, for example bearings for horizontal rotors or for rotors having an optional axial position with unidirectional transverse forces, are frequently required in technology. For example it is desirable to magnetically journal the horizontal rotors of so-called "open end" spinning turbines which rotate at very high speeds. Such spinning turbines are described, for example, in the Journal "Deutsche Textiltechnik, 1971, " Issue 12 from page 763 to page 766.

It is an object of the present invention to provide a magnetic bearing assembly which can absorb transverse forces without substantially increasing the "bearing friction" and the size or energy requirement of the bearing assembly.

In accordance with the present invention, a magnetic bearing assembly for journalling a rotor which is at least partly ferromagnetic in a stator comprises actively controlled radial bearing means holding the rotor on a desired axis of rotation, at least one magnet for producing radial forces, an annular air gap being formed between the magnet and the rotor, and a magnetic field having a constant magnetic field component existing around the periphery of the air gap, wherein in order to absorb substantially steady transverse forces, the radial bearing means holds the rotor in a position in which there exists in said air gap a further magnetic field component which varies around the periphery of the air gap and which is superimposed on the constant magnetic field component.

Preferably, the magnet may be an annular magnet surrounding the rotor. An embodiment is particularly preferred in which the magnet acts as an axially stabilising magnet in cooperation with a face or end of the ferromagnetic material of the rotor. Thus, the magnet can be identical to the magnet used for axial stabilization. In this respect, it fulfils a double function which increases the economy of the bearing assembly. Furthermore, if, in accordance with an advantageous feature, the magnet is so arranged that its magnetic field forms a magnetic bias for electromagnetic radial bearing means, the magnet fulfils a further function which has a positive effect on the radial bearing.

Although it was previously considered that the absorbtion of substantially steady transverse forces in a magnetic bearing assembly produced a great inhomogeneity in the magnetic field that the eddy-current and hysteresis losses in the rotor make the bearing assembly uneconomical, it has transpired that this is not the case with the present invention. In known magnetic bearing assemblies, attempts were made to reduce these losses by the special construction of the rotor, (rotor laminations, ferritic material with low hysteresis, or the like). The present invention has shown that it is possible to keep the losses to so low a value that such expensive measures, which reduce the strength of the rotor, are not required. The losses can be kept to a relatively low value by superimposing a constant magnetic field component on the magnetic field component which varies around the periphery of the air gap and which serves to absorb the transverse forces. Losses due to alternating magnetic flux set up in the rotor when the latter rotates in an inhomogeneous magnetic field, are dependent upon the square of the amplitude of the magnetic induction of the variable component of the magnetic field, while the magnetic attractive forces, required to compensate for the transverse forces, are dependent upon the product of the magnetic inductions of the constant and varying components of the magnetic field. In other words, the component of the magnetic field which is constant around the periphery of the air gap does not contribute to increasing the losses, but acts as a factor increasing the attractive forces. The magnetic field in the air gap only exerts attractive forces around the entire periphery of the air gap and preferably does not vary its polarity in the peripheral direction.

In this manner, bearing principles which have been considered to be disadvantageous because of the losses involved can be used with practical economy. Thus, in a preferred embodiment of the invention, the magnet is an electromagnet fed by alternating current and is spatially and/or functionally coupled to a coil which, in the manner of an alternating voltage bearing, effects radial stabilization of the desired axis of rotation. Such bearings, which can also be called "resonant circuit bearings," can be advantageous, since, inter alia, they do not require any sensors.

Figure 4:
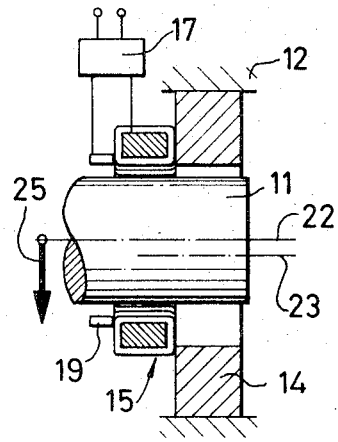
Figure 2:
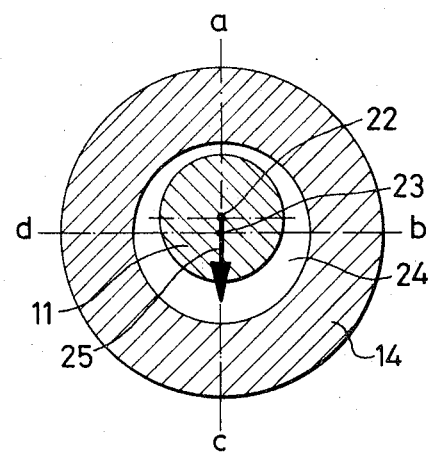

Preferred embodiments of the present invention will hereinafter be described with reference to the accompanying drawings, in which:

FIG. 1 shows schematically a partially sectioned side elevation of an electromagnetic bearing assembly for a rotor having a horizontal axis of rotation, FIG. 2 shows a section taken on line II—II of FIG. 1, FIG. 3 is a graph showing the magnetic induction B plotted against the periphery U of the air gap of the assembly of FIG. 1, FIG. 4 shows a partially sectioned side elevation of part of a further embodiment, FIGS. 5 and 6 show cross-sections of still further embodiments of electromagnetic bearing assemblies, FIG. 7 shows a section taken on line VII—VII of FIG. 6, FIG. 8 shows a cross-section through a modified embodiment of a bearing assembly and is taken along line VIII—VIII of FIG. 9, FIG. 9 shows a section taken on line IX—IX of FIG. 8, FIG. 10 shows a cross-section of a further embodiment of a bearing assembly, FIG. 11 shows a section taken on the lines XI—XI of FIG. 10, and FIG. 12 shows a partially sectioned, side elevation of a further embodiment having an electromagnet and an alternating voltage resonant circuit bearing.

FIG. 1 shows a rotor 11 journalled in a stator 12 (indicated only diagrammatically) by means of a contactless magnetic bearing assembly. In the embodiment illustrated in FIG. 1, the rotor 11 is made entirely from ferromagnetic material and, for example, is in the form of a steel tube or a steel cylinder. However, it is also possible to manufacture the rotor from other material and to provide ferromagnetic portions therein in the regions of the bearings.

As shown in FIG. 1, each end of the rotor 11 is journalled by means of a magnetic bearing 13.

Each magnetic bearing 13 has a magnet 14,14' in the form of an annular permanent magnet. As shown in FIG. 1, the magnet 14 is axially magnetized and the magnet 14' is radially magnetized. Furthermore, each magnetic bearing 13 includes radial bearing means 15 having electrical coils 16 connected to a control device 17.

The bearing means 15 includes a ferromagnetic, annular core 18 around which the coil 16 is wound in an annular, that is, toroidal, configuration. Preferably, the coil 16 comprises four portions which may be separately energized. The bearing means 15 makes it possible to actively control the rotor in two radial directions, for example, in a vertical direction lying in the plane of the drawing of FIG. 1, and in a horizontal direction in a plane at right angles to the plane of the drawing of FIG. 1. A bearing means as 15 has been described in German Pat. Application No. P 22 13 465.2 and its corresponding U.S. application Ser. No. 342,148, filed Mar. 16, 1973, entitled "Electromagnetic Bearing Means" in the name of Karl Boden. Alternative bearing means are described in U.S. Pat. No. 3,650,581.

The control device 17 processes signals from contact-free sensors 19 which, in the embodiment shown in FIG. 1, are electromagnetic components which are arranged in the region of the magnets 14,14' and which produce signals in dependence upon their respective distances from the rotor 11. Such sensors 19 are known as field plates. Alternatively, alternatively, suitable capacitive, inductive or photoelectric sensors may be used. The control device 17 is connected to a source of current, preferably a source 20 of direct current, and comprises an amplifier and a phase shifter for the signals of the sensors 19. The position of the required axis 22 of rotation of the rotor 11 can be adjusted by means of an adjusting device 21, such as a potentiometer, which forms part of the control device 17. For the sake of clarity, FIG. 1 only shows each control device 17 having two sensors 19 arranged diametrically opposite to each other, and a single adjusting device 21. This control device 17 and its associated two sensors 19 act in the plane of the paper of FIG. 1. A control device and associated sensors is also required for the plane at right angles thereto. The latter control device can be combined with the first control device to form a single structural unit.

The bearings at each end of the rotor 11 do not substantially differ from one another. The magnet 14' shown on the left hand side of FIG. 1 is radially magnetized, that is, its poles are located on the inner and outer peripheries of the annular magnet 14'.

In the embodiment shown in FIG. 1, the magnets 14,14' and the bearing means 15 are aligned with a central axis 23 which, as may be seen more particularly from FIG. 2, does not coincide with the required axis of rotation 22. In the embodiment illustrated the required axis of rotation 22 is located above the central axis 23, so that an air gap 24, whose radial dimensions vary around the periphery, is formed between the magnets 14,14' and the rotor 11. The rotor 11 is acted upon by a substantially steady transverse force which, in the illustrated embodiment, is produced by the effect of gravity on the rotor, that is due to the weight of the rotor 11. Because of the horizontal position of the rotor, gravity acts in a radial direction. However, other transverse forces may act upon the rotor, and may also be counteracted by the magnetic bearing assembly of the invention. Preferably, these transverse forces should be substantially steady, so that the bearing assembly in accordance with the invention can be used particularly advantageously when variations in the magnitude and direction with respect to the stator of the transverse force are only slight. However, even if the transverse forces vary in magnitude and direction, the embodiment of the invention can be adapted, for example, by shifting the position of the required axis 22 of rotation with respect to the magnetic field of the magnets 14,14'.

The bearing assembly illustrated in FIGS. 1 and 2 operates in the following manner:

The annular magnet 14 exerts radial forces on the rotor 11 which, with the exception of the central position in which they compensate one another, have a destabilizing effect on the rotor 11 that is the magnet 14 seeks to attract the rotor 11 to bridge the air gap 24. These destabilizing forces increase with the deflection of the rotor 11 from the central position, and are thus progressive. A rotor which is not acted upon by steady transverse forces is maintained in a position which is as near to the described central position as possible, preferably by means of the radial means 15. In the case of the circularly symmetrical and magnetized magnets 14,14', the central position will be the position in which the desired axis of rotation 22 coincides with the central axis 23. When the rotor 11 is in the central position it is influenced to the least extent by the destabilizing forces, and is also permeated by a homogeneous magnetic field of the magnets 14,14', that is, a magnetic field which remains uniform around the periphery of the air gap 24. When arranged in the manner illustrated in FIG. 1, the magnets 14,14' act as axially stabilizing magnets, since, in cooperation with the ends 26 of the rotor 11, they produce an axial position of the rotor which is stable without actively controlled influencing. Therefore, the magnet 14, which would be uppermost, would act as a support bearing if the rotor 11 were journalled vertically.

In the embodiment illustrated, the position of the desired axis of rotation 22 is displaced relative to the central axis 23, namely in a direction opposite to the direction of the transverse force indicated by the arrow 25. This can be effected by appropriate adjustment of the radial bearing means 15 by adjusting them by means of the adjusting device 21 such that they retain the rotor on the desired axis of rotation 22.

Destabilizing forces directed in the direction opposite to the direction of the transverse force 25 now act upon the rotor 11 and seek to pull the rotor 11 upwardly and oppose the transverse force 25. Preferably, the desired axis of rotation 22 is so positioned that these destabilizing forces exactly cancel the transverse force 25. A distribution of the magnetic field, as is shown in FIG. 3, now prevails in the air gap 24.

Referring to FIG. 3, the magnetic induction B is plotted around the periphery U of the air gap 24. A magnetic field $\Delta B$ varying around the periphery U of the air gap 24 is superimposed on the constant magnetic field component $B_o$. If the quarters of the periphery of the air gap from the top in a clockwise direction are designated $a$ to $d$ as shown in FIG. 2, it will be seen from FIG. 3 that the induction B is greatest at point $a$ ($B_o + \Delta B$), and at a minimum at point $c$ ($B_o - \Delta B$).

It must be borne in mind that FIG. 3 is only a diagrammatic representation. The curve for $\Delta B$ does not need to be sinusoidal as is illustrated, although this is desirable in the interest of low losses.

Thus, it will be seen that, compared with the magnetic induction $B_o$, a variation occurs which strengthens the magnetic field at the point $a$, while it weakens the magnetic field at the point $c$. It might be assumed that absorbing the transverse forces is disadvantageous and can only be obtained at the expense of a large force, acting in one direction, being opposed by a still larger force acting in the other direction, and that particularly the losses caused by the magnetic fields would increase to a great extent. However, the opposite is the case. While the eddy-current and hysteresis losses, which act to decelerate the rotation of the rotor, are dependent upon the square of the varying magnetic field component ($\Delta B$), the forces opposing the transverse forces are dependent upon the product of the constant and variable magnetic field components ($\Delta B \cdot B_o$). Thus, it is not only not disadvantages but even desirable to choose the constant magnetic field component $B_o$ to be very high compared with $\Delta B$. Only a very small variable magnetic field component $\Delta B$ is then required in order to obtain large forces, while the losses remain small, since they are dependent upon $\Delta B$.

However, these are not the only advantages of a high constant magnetic field component. When, as is illustrated in FIG. 1, the axially opposing actions of the magnets 14,14' act to axially guide the rotor 11, a high constant magnetic field component, that is a high magnetic field strength in the air gap 24, can provide a particularly rigid axial bearing. Furthermore, high magnetic biasing of the radial bearing means 15 enhances the efficacy of the bearing means 15. It should be pointed out that the bearing means 15 illustrated always require a magnetic bias which, in the present instance, is effected by the magnets 14,14'. Thus, in the embodiment illustrated in FIG. 1, the magnets 14,14' have a three-fold function. They absorb the transverse force 25, they provide axial stabilization of the position of the rotor 11 without active control, and act as a magnetic bias for the radial bearing means 15. The rotor 11 may be driven by any suitable means, for example, by a three-phase motor (not illustrated) whose armature is the rotor.

Variants of the above described magnetic bearing assembly are illustrated in FIGS. 4 to 12. Unless otherwise stated, the mode of operation is substantially the same as that already described, and the same reference numerals have been used to indicate similar parts.

The bearing assembly illustrated in FIG. 4 differs from the right hand bearing assembly illustrated in FIG. 1 only in that the central point of the radial bearing means 15 is not on the central axis 23 of the magnet 14, but on the desired axis of rotation 22. Also, the sensors 19 are arranged to be at the same radial distance from the desired axis of rotation 22. In other words, the radial bearing means 15 has been radially offset, relative to the magnet 14, in the direction opposite to the direction of the transverse force 25. Thus, while the displacement of the desired axis of rotation 22 from the central position was effected by adjustment at the regulating device 17 in FIG. 1, mechanical displacement is effected between the radial bearing means 15 and the magnet 14 in FIG. 4.

The embodiment shown in FIG. 5 has a magnet 14a which, although substantially in the form of an annular magnet has a non-uniform wall thickness in the radial direction. In the example illustrated, the transverse force 25 acts on the rotor 11 at an angle to the vertical, caused, for example, by drive influences etc.. Accordingly, the inner opening 27 of the magnet 14a, defined by the inner surface, is offset in the direction of the transverse force 25 relative to the outer surface 28 of the magnet 14a. Thus, with the same specific magnetizing of the magnetic material of the magnet 14a, a stronger magnetic field is formed in the air gap 24 at the side opposed to the direction of the transverse force 25 (top left in FIG. 5). In the embodiment illustrated, the desired axis of rotation 22 passes through the centre point of the circular outer surface 28 of the magnet 14a. Thus, the desired axis of rotation 22 is again asymmetrical of the inner opening 27 of the magnet 14a, and thus the thickness of the air gap 24 varies. However, it may be mentioned that the intended effect of absorbing the transverse force 25 would occur even if the rotor 11 were to rotate about the central axis 23' of the inner opening 27, since the magnetic field in the air gap 24 would be stronger at the top left side in FIG. 5 because of the greater concentration of magnetic material.

Referring to FIGS. 6 and 7, the magnetic bias is provided by two magnets 14b and 14c arranged axially one behind the other. Both magnets 14b and 14c are provided with an eccentric inner opening 27 corresponding to FIG. 5. The outer surfaces 28 of the two magnets 14b and 14c coincide, but the magnets have been turned in their angular positions relative to one another such that they form between then an opening 27' having an oval configuration composed of two arcs of a circle. The rotor 11 is arranged in the opening 27' so as to be offset towards the side at which the largest radial thickness of the material of the two magnets 14b and 14c is located, that is in the direction opposite to the direction of the transverse force 25. The desired axis of rotation 22 is again located at the centre point of the circular outer surface 28. Here also, as in the case of FIGS. 4 and 5, it is possible to displace the desired axis of rotation relative to the stated preferred position. In the embodiment illustrated in FIGS. 6 and 7, and in addition to the advantage that, compared with FIG. 2, the variation in the thickness of the air gap does not have to be too great, it is possible to adjust the magnitude of the absorbed transverse forces 25 by turning the two halves 14b and 14c of the magnet relative to one another.

Furthermore, it will be seen from FIG. 7 that these radial bearing means, like the other bearing means shown in FIG. 9, can be used merely as radial support bearings in that they do not cooperate with one end of, or one edge in the ferromagnetic material of, the rotor.

In this case, the radial bearing means do not exert any substantial axial forces.

FIGS. 8 and 9 show an embodiment in which a magnet 14d is a permanent, axially magnetized, annular magnet having an overall uniform radial thickness and which is provided on each side with disc-shaped pole shoes 29. The pole shoes 29 have an inner opening 30 which is smaller than the inner opening 27 of the annular magnet and which is arranged eccentrically of the opening 27. Although the desired axis of rotation 22 of the rotor 11 passes through the centre point of the circular outer surface 28 of the magnet 14d, an air gap 24 is thus provided which is smaller at the side opposite to the direction of the transverse force 25 than at the bottom side in FIG. 8. The pole shoes 29, which may be made from ferro magnetic sheet metal discs, thus strengthen the magnetic field in the upper region by bringing it near to the rotor 11.

FIGS. 10 and 11 show an embodiment in which an annular magnet 14e having a uniform radial wall thickness is again used, although the rotor 11 rotates concentrically therein. Thus, the air gap 24 between the magnet 14e and the rotor 11 has the same overall thickness. In this embodiment, the variable magnetic field component is produced by a magnetic member 32 which completes the magnetic flux path and which may have, for example, the illustrated crescent-shaped configuration and forms a magnetic short circuit in the bottom region of the axially magnetized magnet 14e, so that the magnetic field is weakened in the bottom portion of the air gap 24 compared with the top portion. This embodiment has the advantage of an air gap of uniform thickness, and the advantageous possibility of adapting identical annular magnets to different transverse forces. However, it may be mentioned that adaptation to different transverse forces is normally effected in a simple manner by varying the amount by which the desired axis of rotation is shifted in the direction opposite to the direction of the transverse force.

Referring to FIG. 11, the magnet 14e, together with two shoulders 33, 36 in the ferromagnetic material 37 of the rotor 11, exert axial stabilizing forces on the rotor 11. The shoulder 36 is formed only in the ferromagnetic material 37. On the other hand, the outer surface of the rotor 11 is rendered continuous by non-ferromagnetic material 38 contiguous to the shoulder 36. In this manner, it is possible to produce axial guidance of the rotor 11 in the two axial directions by means of only one magnet 14e. It may be mentioned that axial vibrations of the rotor are damped by eddy-current and hysteresis losses. This is adequate for most fields of application, whereas active damping, such as is offered by the magnetic bearing assembly in accordance with the invention, is required in a radial direction.

In all the embodiments illustrated, the magnet is an annular permanent magnet surrounding the rotor 11. This is a particularly advantageous embodiment, since, on the one hand, a permanent magnet is not dependent upon a continuous power supply and, on the other hand, the ends of the rotor remain free from portions of the bearing assembly. However, it is also possible for the magnet to be in the form of a bar magnet which extends into a hollow end of the rotor. In a similar manner, by shifting the desired axis of rotation, a force is created which can oppose a transverse force 25.

Alternatively, FIG. 12 shows an embodiment in which an electromagnet 14f is used. The electromagnet 14f is in the form of a toroidal coil which surrounds the rotor 11 and which produces an axially directed magnetic field. It can have alternating current flowing therethrough and can absorb a transverse force 25 and/or provide for the axial stabilizing of the rotor. At least three further coils, of which the coils 34 34' are illustrated, are arranged around the periphery of the rotor and are effective in a radial direction. For the sake of simplicity, the coils 34 are illustrated separately but may be coupled to the electromagnet 14f, spatially and/or functionally. Each coil cooperates with a control device 35 to form radial bearing means. The control device 35 is connected to a source of alternating voltage and, together with the coil 34, forms an alternating voltage resonant circuit bearing means. In this known type of bearing means, each coil 34 is arranged in a resonant circuit which is detuned by displacement of the rotor and thus simultaneously replaces radial bearing means and associated sensors. By superimposing the magnetic fields of the coil electromagnet 14f and the coil 34, the force effect of the coil 34 is amplified in the described manner, particularly when they are operated at the same frequency. Thus, the principal disadvantage of an alternating voltage bearing, namely the eddy-current and hysteresis losses in the rotor, are partially eliminated.

Many modifications of the described and illustrated embodiments are possible within the scope of the invention. Thus, for example, an electromagnet fed with direct current can be used instead of a permanent magnet, thus offering simpler possibilities of adapting to varying transverse forces. It is also possible to combine the electromagnet with a permanent magnet which, receives the main load. In the magnetic bearing assembly in accordance with the invention, care should always be taken that the field varies uniformly in the air gap (see FIG. 3), i.e., that, as far as possible, no abrupt variations of the magnetic field occur in the air gap. Abrupt variations would produce eddy-currents or hysteresis losses in the rotor material which would be amplified during rotation of the rotor. It will be appreciated that this primarily applies to rotating, particularly rapidly rotating rotors, while rotors which rotate only very slowly or which only carry out oscillatory movements, require such measures to a lesser extent. In this connection, it may be mentioned that when rotors are referred to in the above, this also includes other kinds of members which may be magnetically journalled, for example, for measuring purposes. A large number of embodiments have been described above in which, by virtue of the construction in accordance with the invention, the magnet produces magnetic fields of unequal strength around the periphery of the air gap. Alternatively, such an effect can be produced by magnetizing the magnetic material non-uniformly around the periphery. By way of example, a rotor could be allowed to rotate centrally in a circularly symmetrical magnet which, nevertheless, is suitable for absorbing transverse forces. The term "feromagnetic material" primarily refers to magnetizable but not self-permanent magnetic material. An advantage of the invention is that permanent magnets are normally not required on the rotor, since these magnets generally have only a low strength and increase the weight of the rotor. However, for specific purposes, a construction could be provided in which a destabilizing effect is produced by means of a permanent magnet arranged on the rotor. By way of example, the rotor, or a part of the rotor, could be in the form of a bar magnet which cooperates with a ferromagnetic ring fixed to the stator.

We claim:

1. A magnetic bearing assembly for journalling in a stator a rotor subject to a steady force in a direction transverse to its rotational axis and having ferromagnetic portions comprising radial bearing means cooperating with said ferromagnetic portions for holding the rotor on a desired axis of rotation, means for controlling said radial bearing means, an annular air gap being defined between said rotor and said bearing means, and magnetic means for generating a magnetic field within said air gap, said magnetic means having a first magnetic field component which is constant in radial directions around the periphery of the air gap, and a second magnetic field component superimposed on said first magnetic field component, said second magnetic field component varying in radial directions around the periphery of the air gap and generating a constant force acting in opposition to the steady transverse forces acting on the rotor.

2. A magnetic bearing assembly according to claim 1 in which said means for setting up the magnetic field comprises at least one magnet for producing magnetic forces acting radially on said rotor.

3. A bearing assembly according to claim 2, in which the magnet is an annular magnet surrounding the rotor.

4. A bearing assembly according to claim 2, in which the magnet acts as an axially stabilizing magnet.

5. A bearing assembly according to claim 4, in which at least one further magnet is provided in addition to the magnets acting as axially stabilizing magnets.

6. A bearing assembly according to claim 2, in which said radial bearing means is electromagnetic and in which the magnet has its magnetic field disposed to provide a magnetic bias for the electromagnetic radial bearing means.

7. A bearing assembly according to claim 6, in which the magnet is connected to the radial bearing means to form a structural unit.

8. A bearing assembly according to claim 6, in which the rotor is fully journalled in the stator by means of two spaced units arranged on the rotor, each unit comprising a magnet and a radial bearing means, and in which at least one end of the rotor cooperates with one of said units.

9. A bearing assembly according to claim 6, in which the rotor is fully journalled in the stator by means of two spaced units arranged on the rotor, each unit comprising a magnet and a radial bearing means, and in which at least one shoulder of the ferromagnetic material of the rotor cooperates with one of said units.

10. A bearing assembly according to claim 1, in which the desired axis of rotation of the rotor is displaced relative to the centre of the first magnetic field component in the opposite direction to the effective direction of the transverse force.

11. A bearing assembly according to claim 1, in which the air gap defined between the rotor and said bearing means is of varying thickness, the thickness of the air gap being least at the side of the air gap opposed to the direction in which the transverse force is effective.

12. A bearing assembly according to claim 2, in which the magnet has a non-uniform magnetic field strength around the periphery of the air gap.

13. A bearing assembly according to claim 2, in which the magnet is a permanent magnet.

14. A bearing assembly according to claim 13, in which the magnet comprises at least one permanent annular magnet having an eccentric bore.

15. A bearing assembly according to claim 14, in which the magent is made from material which is magnetized with non-uniform strength around the periphery.

16. A bearing assembly according to claim 15, in which the dimensions of the magnet vary around the periphery.

17. A bearing assembly according to claim 13, in which the magnet comprises a plurality of permanent annular magnets each having an eccentric bore, the centers of the bores of certain of said magnets being radially displaced from the centers of the bores of other of said magnets.

18. A bearing assembly according to claim 2, in which the magnet is an electromagnet.

19. A bearing assembly according to claim 2, in which the magnet carries eccentrically arranged pole shoes.

20. A bearing assembly according to claim 2, in which a magnetic short circuit member is arranged on the periphery of the magnet.

21. A bearing assembly according to claim 2, in which the radial bearing means and the magnet are offset relative to each other.

22. A bearing assembly according to claim 1, in which the second magnetic field component vanes uniformly.

23. A bearing assembly according to claim 18, in which the electromagnet is fed with alternating current and is spatially and functionally coupled to coils which effect radial stabilization of the desired axis of rotation in the manner of alternating voltage bearings.

24. A bearing assembly according to claim 1, in which the amplitude of the second magnetic field component is smaller than the amplitude of the first magnetic field component so that the magnetic field in the air gap does not change its polarity in the peripheral direction of the air gap.

25. A bearing assembly according to claim 8, in which the desired axis of rotation is displaced relative to the centre of the first magnetic field component in the opposite direction to the effective direction of the transverse force, in which the magnet is a permanent annular magnet, and in which the amplitude of the second magnetic field component is smaller than the amplitude of the first magnetic field component so that the magnetic field does not change to polarity in the peripheral direction of the air gap.

26. A bearing assembly according to claim 8, in which the air gap defined between the rotor and the magnet is of varying thickness, the thickness of the air gap being least at the side of the air gap opposed to the direction in which the transverse force is effective, in which the magnet comprises a permanent annular magnet having an eccentric bore, and in which the dimensions of the magnet vary around the periphery.

27. A bearing assembly according to claim 9, in which the air gap defined between the rotor and the magnet is of varying thickness, the thickness of the air gap being least at the side of the air gap opposed to the direction in which the transverse force is effective, and in which the magnet comprises two permanent annular magnets each having an eccentric bore and which can be turned relative to each other.

28. A bearing assembly according to claim 9, in which the magnet is a permanent annular magnet carrying eccentrically arranged pole shoes.

29. A bearing assembly according to claim 9, in which the magnet is a permanent annular magnet carrying a magnet short circuit member on its periphery.

30. A bearing assembly according to claim 9, in which the magnet is an electromagnet fed with alternating current and spatially and functionally coupled to coils which effect radial stabilization of the desired axis of rotation in the manner of alternating voltage bearings.

* * * * *